June 3, 1952 H. JENSEN 2,598,697
METHOD AND APPARATUS FOR CONDUCTING GEOPHYSICAL SURVEYS
Filed July 2, 1946 3 Sheets-Sheet 1

Inventor
H. JENSEN
By M. A. Hayes
Attorney

June 3, 1952          H. JENSEN          2,598,697
METHOD AND APPARATUS FOR CONDUCTING GEOPHYSICAL SURVEYS
Filed July 2, 1946          3 Sheets-Sheet 2
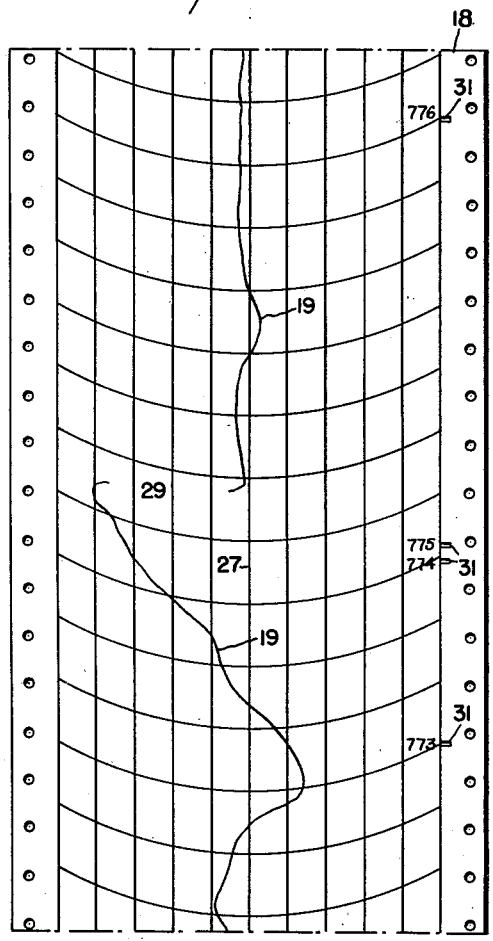
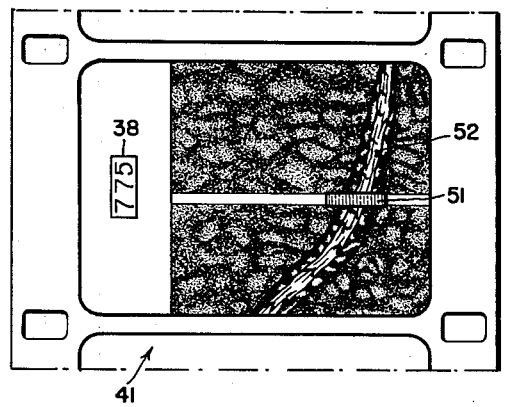
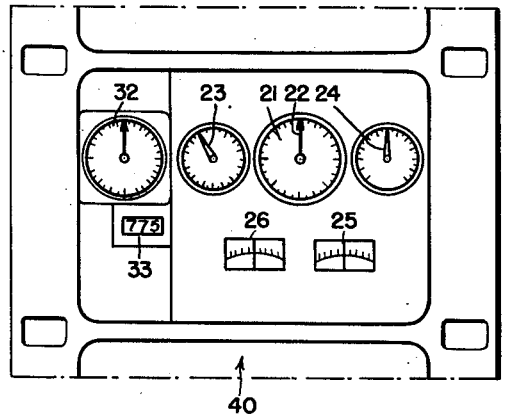
Inventor
H. JENSEN
By
Attorney

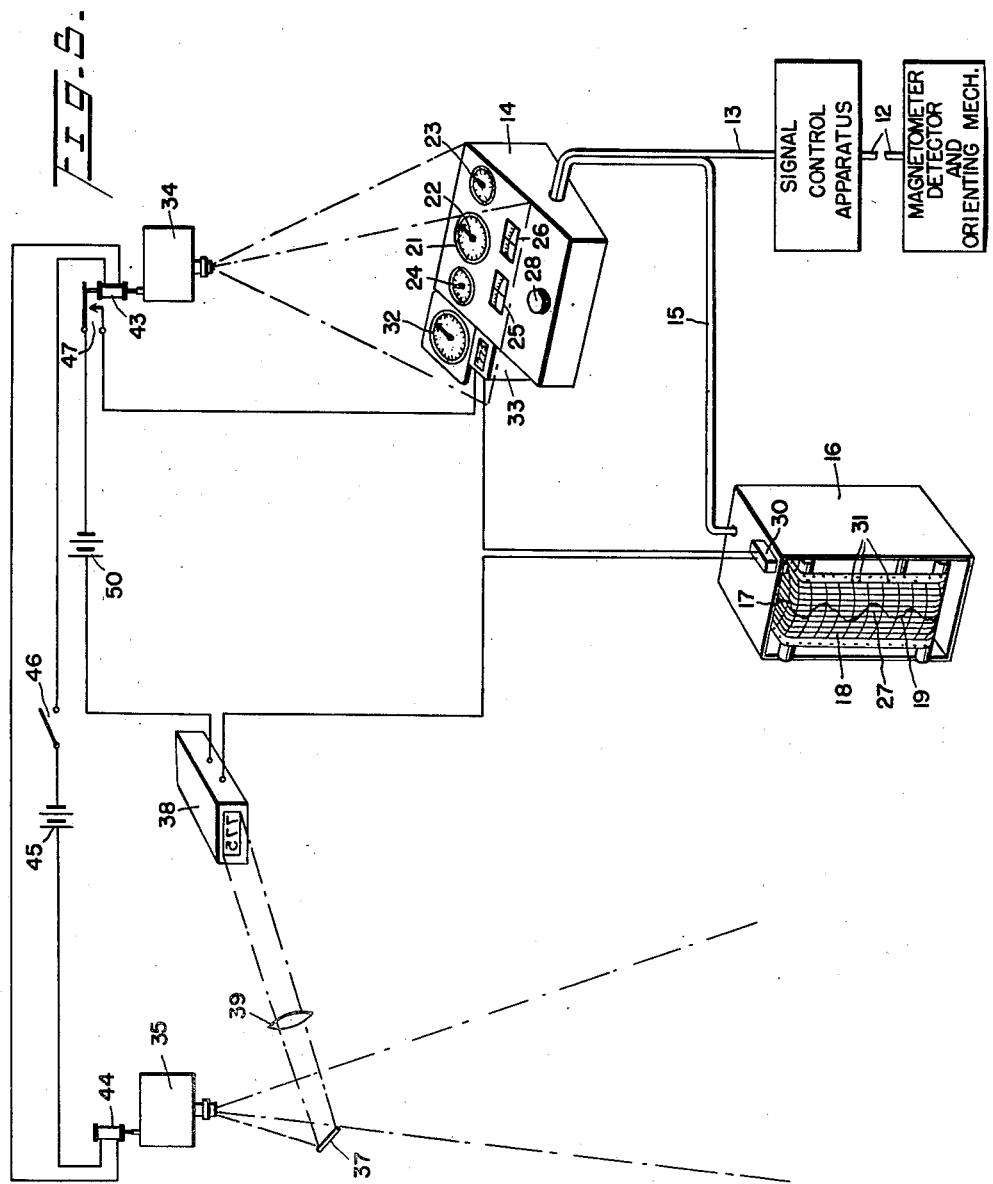

Patented June 3, 1952

2,598,697

UNITED STATES PATENT OFFICE 2,598,697

METHOD AND APPARATUS FOR CONDUCTING GEOPHYSICAL SURVEYS

Homer Jensen, Philadelphia, Pa.

Application July 2, 1946, Serial No. 680,907

5 Claims. (Cl. 175—182)

(Granted under the act of March 3, 1883, as amended April 30, 1928; 370 O. G. 757)

This invention relates generally to apparatus for conducting geophysical surveys from an aircraft in flight and more particularly to improvements in the method and apparatus disclosed in the copending application of Lynn H. Rumbaugh et al. for Method and Apparatus for Conducting Geophysical Surveys, Serial No. 682,518, filed July 10, 1946.

In the aforesaid application a standard Navy magnetic airborne detector, identified as AN/ASQ-3A and referred to hereinafter as MAD, is adapted to provide a continuous record trace corresponding to space changes in the total value of the earth's magnetic field as the aircraft moves along a predetermined traverse, the MAD including a control box having dials for adjusting and indicating the sensitivity of the MAD and the value of the center or base line of the recording chart upon which the record trace appears. Photographic apparatus is employed with the MAD and is adapted to permanently fix and record ground positions corresponding respectively to certain points on the record trace.

A radio altimeter and an electric number counter are associated with the control box, and a conventional edge-marking device, adapted to be operated in synchronism with the number counter as each photograph of the terrain is taken by the aforementioned photographic apparatus, is operatively associated with the recorder to edge-mark the chart thereof.

The photographic apparatus includes a camera adapted to photograph selected check points on the ground disposed along the traverse and an optical system adapted to split the field of view of the camera and superimpose on the film adjacent the image of the terrain thereon, images of the control dials, altimeter dial and a serial number appearing on the counter, thereby to indicate on the photographic record at the time each picture of the terrain is taken, the degree of sensitivity of the MAD, the magnetic value of the center line of the recording chart, the height of the aircraft above the ground, and a serial number having a corresponding edge-mark on the recording chart.

In the use of this apparatus, the aircraft is caused to move along a systematic series of adjoining and transverse traverses at each of several different altitudes. The record trace is produced continuously during the course of each traverse and, at selected points therealong, composite photographic records of the terrain and control box readings are produced simultaneously, these records being correlated with the record trace by the edge-marks on the recorder chart. Thereafter, by plotting the relationship between the variations in the magnetic field strength and the ground positions corresponding thereto, it is possible to draw isomagnetic contours from which logical inferences and accurate quantitative deductions as to the nature of the substrata can be established.

The arrangement of the foregoing apparatus has not been found to be entirely satisfactory in all conditions of use thereof for the reasons that the control box must be located within the split field of view of the single camera employed and considerations of available space and convenience of operation of the control box render the installation of such apparatus in certain types of aircraft extremely difficult, if at all possible.

According to the arrangement of the apparatus of the present invention, two cameras are employed and adapted respectively to photograph the terrain beneath the plumb line of the aircraft and the instrument dials of the control box and the altimeter and the electric number counter associated therewith, a second number counter and an optical system including an element interposed within the field of view of the terrain camera being employed so as to superimpose on the film adjacent the image of the terrain an image of the number appearing on the second counter. The cameras are preferably of any suitable type capable of automatic cocking and winding operations, and a pair of solenoids individual thereto are provided for operating the shutters thereof, a first electric circuit including the solenoids being provided to synchronize the operation of the cameras upon the closure of a control switch and a second circuit controlled by the first circuit and including the number counters being employed to synchronize the operation thereof.

By reason of the foregoing arrangement, the control box may be situated in an upright position in any available space or compartment within the aircraft spaced from the position therein in which the terrain camera is mounted. In certain types of combat planes, for example, the terrain camera conveniently may be mounted in the bombardier's compartment and the control equipment including the control box may be conveniently mounted within the pilot's compartment.

An object of the present invention, therefore, is to provide a new and improved apparatus for conducting geophysical surveys from an aircraft in flight.

Another object is to provide new and improved method and apparatus for correlating the record trace obtained from an airborne magnetometer with ground positions corresponding thereto.

A further object is to provide separate photographic records of control box data relating to the record trace obtained from an airborne magnetometer and of the ground positions corresponding thereto, and to correlate such records by identifying numbers appearing thereon.

An additional object is to provide geophysical surveying apparatus of the aforedescribed character in which the several components thereof may be stationed at will in different portions of the aircraft.

Still other objects, features and advantages of the present invention are those relating to the novel combination and arrangement of parts as will become more clearly apparent from the following description of the preferred arrangement of the apparatus and the control circuits therefor, reference being had to the accompanying drawings wherein:

Fig. 2 is a plan view of a record chart illustrating the form of record trace obtained in the use of the apparatus of the present invention;

Fig. 3 is a plan view of a portion of the composite photographic record produced by the terrain camera employed in the apparatus;

Fig. 4 is a plan view of a portion of the composite photographic record produced by the instrument camera of the apparatus; and Fig. 5 is a diagrammatic view of the complete apparatus which is supported in part in the aircraft and in part in the aerodynamic body illustrated in Fig. 1.

Figure 1:
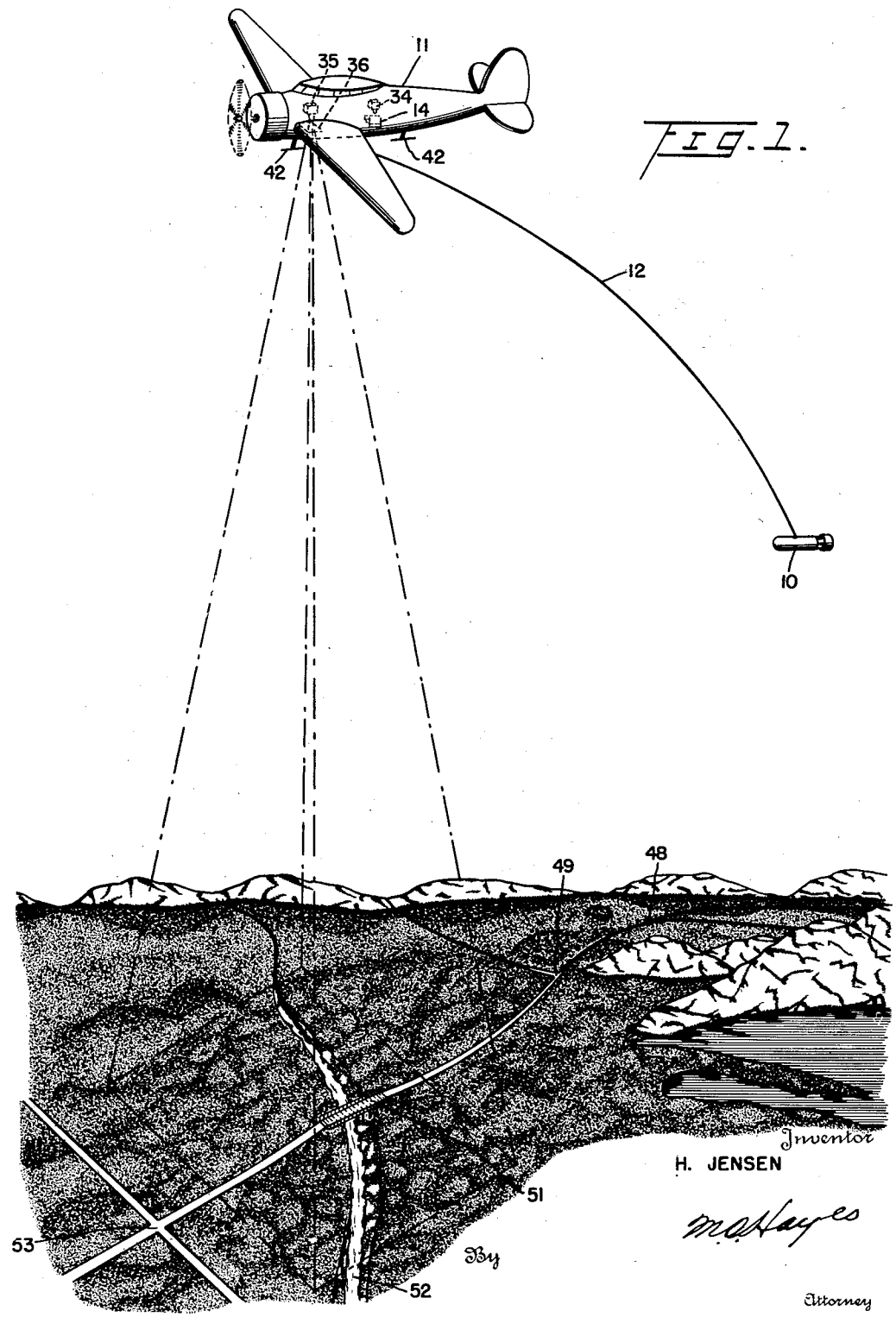
Fig. 1 is a diagrammatic view of an aircraft and an aerodynamic body towed thereby and suitable for use with the apparatus of the present invention.

Referring now to the drawings for a more complete understanding of the invention, the MAD equipment shown diagrammatically in Fig. 5 comprises a magnetometer detector and orienting mechanism therefor, which components are mounted within the aerodynamic body 10, Fig. 1. The body 10 is of a non-magnetic construction and is towed from the aircraft 11 at a distance therefrom by a cable 12 so as to avoid the effects of the magnetic field of the aircraft. Cable 12 is a strain-cored multi-conductor cable and serves to electrically interconnect the magnetometer and orienting mechanism with the signal control apparatus therefor carried within the aircraft 11, whereby a detecting element in the housing or bird 10 is adapted to be maintained in alignment with the direction of the earth's magnetic field under control of the signal control apparatus.

The signal control apparatus also operates to produce electrical signals which correspond to space changes in the total value of the earth's magnetic field sensed by the detecting element, and these signals are applied by way of cable conductor 13, control box 14, and cable conductor 15 to a recording milliammeter 16 to drive the pen 17 with respect to its coacting chart 18, whereby a record trace 19 is produced on the chart. Recorder 16 preferably is of the E-A type of spring-driven recorder well known in the art.

The electrical signals produced by the signal control apparatus also operate a galvanometer 21 whereby the pointer 22 of the galvanometer indicates in relation to the scale associated therewith, the corresponding movements of the recording pen 17.

The control box 14 also includes a sensitivity adjusting dial 23 by means of which the full scale deflection of the recorder pen 17 from edge to edge of the chart may be controlled, the dial being provided, for example, with sensitivities of 50, 100, 250, 500, 1000 and 5000 gammas. The control box further includes a plurality of dials 24, 25 and 26 which control means for nulling out predetermined portions of the total field at the detector element and thus determine the magnetic value of the center or base line 27 of the recording chart.

Dials 25 and 26 are operatively interconnected and adapted to be controlled from the same adjusting knob 28, these dials being graduated so as to read in ranges of field strength such, for example, as 0 to 2,200 gammas in 22 steps of 100 gammas each and 0 to 100 gammas in 100 steps of 1 gamma each respectively. Dial 24, which is referred to as a latitude adjustment, is graduated so as to provide a range of field strength such, for example, as 0 to 45,000 gammas in 30 steps of 1,500 gammas each.

Thus, in a total field at the detector element of approximately 56,290 gammas, the nulling means may be arranged to null out permanently 30,000 gammas in the field, dial 24 may be adjusted to null out 25,000 gammas, dial 25 may be set to null out 1,200 gammas and dial 26 may be set to null out 90 gammas whereby the recorder pen 17 assumes a position on the base line 27 of the recorder chart 18. Thereafter, upon variation in the field at the detector element, the pen moves to the right or the left according to increases or decreases in the value of the field from said value of 56,290 gammas. Occasionally, it becomes necessary to adjust the control box dials 23 through 26 to keep the pen on scale on the chart, and at such time a break indicated at 29 on the chart, Fig. 2, occurs in the trace 19.

The aforedescribed MAD equipment and the operation thereof are described in detail in the operating and maintenance instructions therefor furnished to the Navy and identified as AN–08–10–252 and CO–AN–08–20–14 respectively, and reference may be had thereto for further details of construction and operation. These reports are available in photostat or microfilm form at the Office of Technical Services, Department of Commerce, the report numbers designating these reports being PB–27559 and PB–27560 respectively.

A conventional electrical edge-marking device 30, usually provided for use with recorders of the aforesaid type, is cooperatively employed with recorder 16 and is adapted upon each operation thereof to produce an edge-mark 31 on the recorder chart 18.

An altimeter 32 and an electric register or number counter 33 are secured to the side of control box 14 so as to be included within the field of view of a camera 34, the control box being located within the aircraft in a convenient position adapted to facilitate adjustments of the controls thereof, and the camera 34 being suspended thereabove in a manner to bring the altimeter, number counter, and control box dials into the same focus on the film, designated generally by the numeral 40.

A similar camera 35 is mounted within the aircraft at a suitable location therein from which to photograph the terrain beneath the plumb-line of the aircraft, as through the port 36. Cameras 34 and 35 may be of any type suitable for the purpose such, for example, as a Sept camera which is adapted to make 250 ¾ by 1 inch photographs on a single roll of 35 mm. film with a single winding of its spring motor, and which is capable of automatic cocking and winding operations.

A reflecting element 37 is interposed within the field of view of camera 35 in such spaced relation with respect to the lens thereof, and a second number counter 38 is so arranged with respect to the reflecting element, as to superimpose on the camera film adjacent each image of the terrain thereon, an image of the serial number appearing on the second counter, the numbers thereon being arranged backwards on the counter so as to appear frontwards on the film. A single element lens 39 is inserted in the split field of view to bring the serial number into the same infinite focus as is required for the terrain portion of the composite picture recorded on the film, generally designated 41.

Except for the backwards arrangement of the numbers on counter 38, it may be identical to counter 33, the counters being of any one of the conventional types well known in the art. Western Electric register counters, type 12F, may be suitable for the purpose.

Altimeter 32 may be any suitable type of radio altimeter such, for example, as the RCA altimeter, RT–7/APN–1, which provides two ranges of 0 to 400 feet and 0 to 4000 feet, and includes two antennae 42 which may be mounted beneath aircraft 11 in the manner indicated in Fig. 1.

A pair of solenoids 43 and 44, individual to cameras 34 and 35, are employed to actuate the shutters thereof, in a well known manner. The solenoids are arranged to be actuated synchronously by means of a simple series circuit including the solenoids, a battery 45 and an actuating switch 46.

Solenoid 43 is arranged, upon actuation thereof, to close a switch 47, thereby to complete a simple series circuit including a battery 50, counter 38, edge-marking device 30, and counter 33 for producing simultaneous actuations of the counters and edge-marking device whereby identical numbers appear on corresponding film records 40 and 41 upon each closure of the camera actuating switch 46, these numbers being consecutively numbered and thus also serving to correlate the film records with the edge-marks corresponding thereto.

In the use of the aforedescribed apparatus in conducting geophysical surveys, the aircraft 11 and its associated magnetometer apparatus are moved along predetermined survey lines or traverses which, in most cases, have been previously laid out on aerial maps which also serve thereafter in locating the terrain pictures obtained during the traverses.

The record trace 19 is produced continuously during the course of the traverses and control dials 23 through 26 are adjusted, as necessary, to keep the pen 17 on scale on the chart 18, or to provide the desired magnitude of the pen deflections, as the case may be.

The record cameras are operated from a seat with good visibility, and exposures are made at frequent intervals along the traverses, preferably as the aircraft passes over identifiable landmarks such, for example, as the road intersections 48 and 49, the bridge 51, river 52, and the road intersection 53.

From time to time, and specifically at the beginning and end of a traverse, the operator makes a notation on the record tape opposite the edge-mark thereon, of the serial number then showing on either of the number counters. The operator also makes a record in his log book of the traverse being flown, and of its terminal numbers.

After the traverses in a predetermined area have been completed and the film used therefor has been developed, the data provided on the photographic records and record trace is analyzed and correlated to provide therefrom, copy traces giving the true relation between the variations in the earth's magnetic field and the ground positions corresponding thereto, and from the copy traces isomagnetic contours are prepared, all in the manner specifically set forth in the aforesaid copending application.

From the foregoing, it should now be apparent that a method and apparatus for conducting geophysical surveys has been provided which is well adapted to fulfill the aforestated objects of the invention, and while the invention has been described in particularity with respect to a specific method and apparatus which gives satisfactory results, it will be understood that various changes may be made by those skilled in the art to which the invention most nearly appertains without departing from the spirit and scope of the invention as defined by the appended claims.

The invention herein described and claimed may be manufactured and used by or for the Government of the United States of America for governmental purposes without payment of any royalties thereon or therefor.

What is claimed as new and desired to be secured by Letters Patent of the United States is:

1. A method of geophysical surveying which comprises the steps of flying an aircraft and magnetometer apparatus associated therewith along a predetermined traverse, measuring the earth's total magnetic field producing a continuous record trace on a recording chart corresponding to the space changes in the absolute or static value of the earth's total magnetic field and simultaneously at each of a plurality of spaced intervals along the traverse edge-marking the recording chart and producing a first photographic record including an image of the terrain beneath the plumb line of the aircraft and a serial number identifying the photographic record with the corresponding edge-mark on the recording chart upon which the record trace appears and a second photographic record including a serial number corresponding to the serial number appearing on said first photographic record and also including data relating to the distance of the aircraft above the surface of the ground and to apparatus control dial settings relating to the sensitivity of the apparatus and the magnetic value of the base line of the recording chart.

2. A method of conducting a geophysical survey which comprises the steps of flying an aircraft and magnetometer apparatus associated therewith along a predetermined traverse, measuring the earth's total magnetic field with said magnetometer, producing within the aircraft a continuous record trace on a recording chart corresponding to space changes in the absolute or static value of the earth's total magnetic field sensed by a detecting element of the magnetometer apparatus adapted to be maintained in alignment with the direction of the earth's magnetic field as the aircraft moves along the traverse, producing simultaneously at each of a plurality of spaced intervals along the traverse a first photographic record of images of an altimeter dial indicative of the height of the aircraft above the terrain, of control dials indicative of the sensitivity of the magnetometer apparatus and of the magnetic value of the base or center line of the recording chart upon which the record trace appears, and of the serial number appearing on a first register counter and a second photographic record of images of the serial number appearing on a second register counter and of the terrain beneath the plumb line of the aircraft, and simultaneously edge-marking the recording chart and advancing the numbers of the register counters as each pair of said photographic records is produced.

3. In apparatus of the character disclosed for conducting geophysical surveys from an aircraft in flight, the combination of magnetometer means including a recorder for producing a record trace on a recording chart indicative of variations in the earth's total magnetic field as the aircraft moves along a predetermined traverse and also including a control box having dials for indicating and adjusting the sensitivity of said trace producing means and the magnetic value of the base or reference line on the recording chart, a pair of electrical number counters, an electrical device for edge-marking the recording chart of the recorder, an altimeter having an indicating dial, means for producing at spaced intervals along the traverse a series of photographic records each including images of a serial number appearing on one of said counters, of the altimeter dial, and of the control box dials, means for producing at spaced intervals along the traverse a series of photographic records each including images of the terrain and the serial number appearing on the other of said number counters, means for synchronously operating each of said photographic record producing means, and a control circuit for simultaneously actuating said edge-marking device and said number counters as each pair of said photographic records is produced.

4. In apparatus of the character disclosed for conducting geophysical surveys from an aircraft in flight, the combination of magnetometer means including a recorder for producing a record trace on a recording chart indicative of space changes in the absolute or static value of the earth's total magnetic field as the aircraft moves along a predetermined traverse, an altimeter having an indicating dial, a pair of electric number counters, a camera having a shutter and a film adapted to receive thereon in successive order a plurality of images of the terrain beneath the plumb point of the aircraft, said trace producing means including a control box having a plurality of dials for adjusting and indicating the full scale deflection of the pen of said recorder with respect to the cooperating chart thereof and the magnetic value of the base or center line of the recording chart, an electrical device for edge-marking the recording chart, a first optical element adapted to reflect the image of a serial number appearing on one of said counters onto the film of said camera adjacent each of said terrain images thereon, a second optical element interposed between said first optical element and number counter for causing the image thereof to be formed on the film in the same focal plane as the image of the terrain thereon, a second camera having a shutter and a film adapted to receive thereon in successive order a plurality of images of said altimeter, of a serial number appearing on the other of said number counters, and of said control dials, a pair of solenoids individual to said cameras for actuating the shutters thereof, a control circuit operable at will for simultaneously actuating said solenoids, and a control circuit adapted to be operated by one of said solenoids for simultaneously actuating said edge-marking device and said counters.

5. In apparatus of the character disclosed for conducting geophysical surveys from an aircraft in flight, the combination of total field magnetometer apparatus including a recorder for producing a record trace on a recording chart corresponding to space changes in the earth's total magnetic field as the aircraft moves along a predetermined traverse, an altimeter having an indicating dial, a pair of electric number counters, said magnetometer apparatus including a control box having a plurality of dials for adjusting and indicating the sensitivity of the magnetometer apparatus and the magnetic value of the base line on the recording chart of the recorder, an electrical device for edge-marking said recording chart, a camera having a solenoid for actuating the shutter thereof and mounted within the aircraft for vertical photography of the terrain, optical means adapted to split the field of view of the camera and superimpose on the film thereof adjacent the image of the terrain thereon an image of one of said pair of number counters for each actuation of the shutter, a second camera having a solenoid for actuating the shutter thereof and including within the field of view thereof said altimeter dial, control dials, and the other of said pair of number counters, a circuit including said solenoids and an actuating switch for simultaneously actuating said cameras at will, and a control circuit including a switch adapted to be actuated by one of said solenoids for simultaneously actuating said edge-marking device and advancing the numbers on said number counters.

HOMER JENSEN.

REFERENCES CITED

The following references are of record in the file of this patent:

UNITED STATES PATENTS

| Number | Name | Date |
|---|---|---|
| 1,331,978 | Brock et al. | Feb. 24, 1920 |
| 1,585,484 | Gasser | May 18, 1926 |
| 1,658,537 | Reinbold | Feb. 7, 1928 |
| 1,912,485 | Kothny | June 6, 1933 |
| 2,167,630 | Bazzoni et al. | Aug. 1, 1939 |
| 2,338,991 | Arnold | Jan. 11, 1944 |
| 2,406,870 | Vacquier | Sept. 3, 1946 |
| 2,424,772 | Rieber | July 29, 1947 |
| 2,428,034 | Nichols et al. | Sept. 30, 1947 |
| 2,468,554 | Hull | Apr. 26, 1949 |
| 2,518,513 | Wyckoff | Aug. 15, 1950 |
| 2,555,209 | Vacquier | May 29, 1951 |

FOREIGN PATENTS

| Number | Country | Date |
|---|---|---|
| 319,867 | Great Britain | Oct. 3, 1929 |

OTHER REFERENCES

Heiland, "A. I. M. E. Transactions," 1932, pages 213–214.

Heiland, "Engineering and Mining Journal," December 1935, pages 609–610.

Logachev, "Geophysics," April 1946, pages 135–157.

"The Airborne Magnetometer," in Geophysics, July 1946, pages 321–334.